United States Patent [19]

Rohner et al.

[11] Patent Number: 4,861,135

[45] Date of Patent: Aug. 29, 1989

[54] RIBBON CABLE WITH OPTICAL WAVEGUIDES

[75] Inventors: Peter Rohner, Isernhagen; Gerhard Ziemek, Langenhagen, both of Fed. Rep. of Germany

[73] Assignee: Kabelmetal Electro Gesellschaft mit beschränkter Haftung, Hanover, Fed. Rep. of Germany

[21] Appl. No.: 156,280

[22] Filed: Feb. 16, 1988

[30] Foreign Application Priority Data

Feb. 27, 1987 [DE] Fed. Rep. of Germany ....... 3706323

[51] Int. Cl.$^4$ .............................................. G02B 6/44
[52] U.S. Cl. .................................................. 350/96.23
[58] Field of Search ...................................... 350/96.23

[56] References Cited

U.S. PATENT DOCUMENTS

| | | | |
|---|---|---|---|
| 3,937,559 | 2/1976 | Ferrentino et al. | 350/96.23 |
| 4,138,193 | 2/1979 | Olszewski et al. | 350/96.23 |
| 4,147,407 | 4/1979 | Eichenbaum et al. | 350/96.34 |
| 4,190,319 | 2/1980 | Eggleston | 350/96.23 |
| 4,239,335 | 12/1980 | Stiles | 350/96.23 |
| 4,355,865 | 10/1982 | Conrad et al. | 350/96.23 |
| 4,496,215 | 1/1985 | Shaheen et al. | 350/96.23 |
| 4,645,297 | 2/1987 | Yoshihara et al. | 350/96.23 |
| 4,772,089 | 9/1988 | Ide et al. | 350/96.23 |

FOREIGN PATENT DOCUMENTS 91717 11/1986 European Pat. Off. ......... 350/96.23

*Primary Examiner*—Frank Gonzalez
*Attorney, Agent, or Firm*—Martin A. Farber

[57] ABSTRACT

A ribbon cable (1) having optical waveguides (2) which are laminated between two ribbons (3, 4). The ribbons (3, 4) have an adhesive layer on one side. They are bonded to the optical waveguides (2) and to each other between them as well as at the edges. The ribbons (3, 4) have the same coefficient of thermal expansion as the optical waveguides (2), they preferably consist of fiberglass-reinforced plastic.

7 Claims, 1 Drawing Sheet

4,861,135

RIBBON CABLE WITH OPTICAL WAVEGUIDES

FIELD AND BACKGROUND OF THE INVENTION

The present invention refers to a ribbon cable with optical waveguides in which at least two light waveguides extend parallel to each other and are embedded, spaced from each other, in a ribbon-shaped support material (European Patent No. 0 091 717).

Optical waveguides (hereinafter referred to as LWG) are complete structures of glass fibers which are suitable without additional processing for the transmission of light waves. Such optical waveguides serve in communications engineering as a replacement for the metal wires customary up to now. They have various advantages over metal wires. Optical waveguides have a very broad band characteristic and are low in attenuation. They are readily flexible and are of small diameter. Furthermore, external electrical or magnetic interference fields do not affect them.

For the use of the optical waveguides for transmission purposes in communications engineering they are arranged in optical waveguide cables in which they are arranged protected against mechanical damage. The optical waveguides can be introduced into a cable core as individual structure or else as several combined.

One possibility for combining the optical waveguides before they are worked into a light waveguide cable can be noted from the aforementioned European Patent No. 0 091 717. The light waveguides are combined therein in the form of ribbon cables which consists of a ribbon-shaped support in which a plurality of channels are arranged extending parallel to each other. The light waveguides lie loose within the channels, into which they are inserted after the support has been produced. At least one such ribbon cable is arranged in the core of a cable which has a protective jacket. This results as a whole in expensive manufacture with a large number of operating steps. This is true, in particular, also of the manufacture of the ribbon cable itself for which there must first of all be produced the support provided with channels into which the optical waveguides are then pushed at great expense.

SUMMARY OF THE INVENTION

It is an object of the invention to provide a optical waveguide cable in the form of a ribbon cable which is simple to manufacture and can be used as final structure without additional protective measures.

According to the invention, there is provided a ribbon cable of the above-described type wherein the optical waveguides (2) are laminated between two ribbons (3, 4) which are provided on one side with an adhesive layer, the ribbons being bonded both to the optical waveguides (2) and to each other, and their coefficient of thermal expansion corresponding to that of the optical waveguides (2).

By the lamination between the two ribbons, the optical waveguides are fixed immovably over their entire length and are furthermore well protected against moisture and damage by bending or kinking. The combination consisting of the two ribbons and the optical waveguides lying between them imparts the ribbon cable the mechanical stability necessary for this. This stability is retained under all conditions to which the ribbon cable is subjected. This applies, in particular, also to influences caused by temperature, which cannot have a negative effect since a material whose coefficient of thermal expansion corresponds to that of the optical waveguides is used for the ribbons. Therefore, no temperature-produced relative movements can take place between the optical waveguides and the ribbons.

The ribbon cable containing the light waveguide has such good mechanical properties that it can be used, without additional protection, as optical waveguide cable or light waveguide line. It can therefore be employed, for example, in the manner of household wiring and thus for instance be laid under wall coverings, along walls or under floor coverings on the floor of rooms. In this case the ribbon cable can be bonded to the corresponding base or, in case of suitable shaping, be connected to it by a strip without optical waveguides, arranged on the edge or in the center of the ribbon cable, even by nails. The ribbon cable is, however, also suitable for introduction into ducts which are present in the walls of buildings.

In the ribbon cable, at least two and preferably even a larger number of light waveguides are arranged at a fixed distance from each other. They can thus easily be connected together or to a device simultaneously. This is particularly true if the light waveguides lie alongside of each other in a predetermined pattern.

According to a feature of the invention, the ribbons (3, 4) consist of fiberglass reinforced plastic.

BRIEF DESCRIPTION OF THE DRAWINGS

With the above and other objects and advantages in view, the present invention will become more clearly understood in connection with the detailed description of preferred embodiments, when considered with the accompanying drawing, of which.

Figure 1:
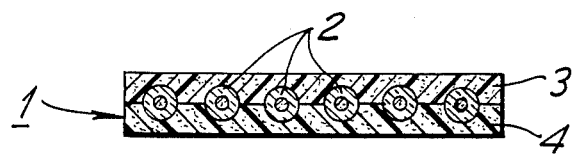
FIGS. 1 and 2 are cross sections of ribbon cables of different shape in accordance with the invention.
Figure 2:
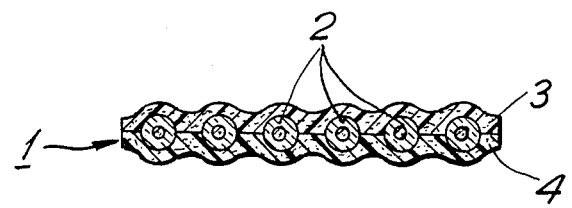
Figure 3:
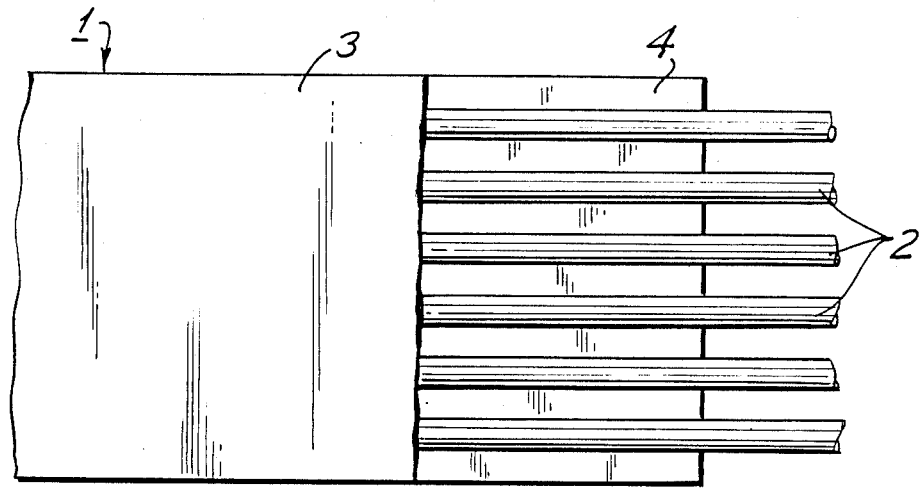
FIG. 3 is a plan view of a ribbon cable partly broken away.

In the ribbon cable 1 shown in FIGS. 1 to 3, six optical waveguides 2 are laminated between two ribbons 3 and 4, one side of each of which is provided with a layer of adhesive. The adhesive layers of the ribbons 3 and 4 face each other upon the production of the ribbon cable 1 so that upon the laminating process they are bonded to the optical waveguides 2 and to each other in the spaces between said optical waveguides as well as at the edges. A number of optical waveguides may be arranged in a ribbon cable 1. This depends on the specific purpose of use. In the preferred embodiment, for example, five to ten optical waveguides 2 can lie alongside of each other in a ribbon cable.

The optical waveguides 2 which are combined in the ribbon cable 1 can be simultaneously connected together or to another device by suitable connecting members or splicing tools. This is true, in particular, if the optical waveguides 2 lie alongside of each other in a predetermined pattern over the entire width of the ribbon cable 1.

The ribbons 3 and 4 consist of a material, the temperature coefficient of which corresponds to that of the optical waveguides 2. In this way the result is obtained that temperature variations cannot affect the optical waveguides 2. In a preferred embodiment, any desired fiberglass reinforced plastic is used as material for the ribbons 3 and 4. The optical waveguides 2 are arranged mechanically protected within the ribbon cable 1. In particular when fiberglass-reinforced plastic ribbons are used, the ribbon cable 1 is furthermore of high tensile strength. By the laminating of the optical waveguides 2 between the two ribbons 3 and 4 there is obtained as a whole a readily bendable structure within which the mechanically sensitive light waveguides 2 are sufficiently stabilized, even upon bending.

The ribbon cable 1 is produced, for instance, as follows:

The desired number of optical waveguides 2 is removed from bobbins and fed, parallel to each other, to a pressing tool which consists, for instance, of two rotatably mounted rollers. The optical waveguides 2 are pulled, together with two ribbons 3 and 4, through a space present between the two rollers. The two ribbons 3 and 4 lie on different sides of the optical waveguides 2. They have, on one side, an adhesive layer which faces the optical waveguides 2 upon the manufacture of the ribbon cable 1.

The ribbons 3 and 4 are pressed against the optical waveguides 2 by the two rollers. They are thereby bonded to the optical waveguides 2 and to each other in the spaces between same, as well as at the edges. If profiled rollers are used for the pressing, there are then obtained ribbon cables 1 having a cross section in accordance with FIG. 2. The ribbons 3 and 4 are in this case pressed inward between the optical waveguides 2.

We claim:

1. A ribbon cable with light waveguides comprising a ribbon-shaped support material comprising two ribbons provided on a facing side thereof with an adhesive layer,
at least two light waveguides extending parallel to each other being embedded, spaced apart from each other, in said ribbon-shaped support material, such that the light waveguides are laminated between said two ribbons, said two ribbons extending towards each other to contact each other between each of said light waveguides and to contact completely the side surfaces of the respective light waveguides, said ribbons being bonded to the complete side surfaces of said light waveguides, said ribbons being bonded to each other at points of contact between said light waveguides, and wherein
said ribbons have a coefficient of thermal expansion corresponding to that of said light waveguides.

2. The ribbon cable with light waveguides according to claim 1, wherein
said ribbons are made of fiberglass-reinforced plastic.

3. The ribbon cable with light waveguides according to claim 1, wherein
said light waveguides are glass fibers.

4. The ribbon cable with light waveguides according to claim 1, wherein
said ribbons have outer flat surfaces.

5. The ribbon cable according to claim 1, wherein
said ribbons have outer surfaces which are profiled such that they form recesses between said light waveguides.
said facing side of each of said ribbons is provided with said adhesive layer.

6. The ribbon cable with light waveguides according to claim 1, wherein
said ribbons form a strip portion without said light waveguides therebetween, said strip portion constituting a means for being connected to a support.

7. The ribbon cable with light waveguides according to claim 1, wherein
the two ribbons are symmetrically positioned about a central plane, center lines of all the waveguides lying in the central plane.

* * * * *